Patented June 28, 1932

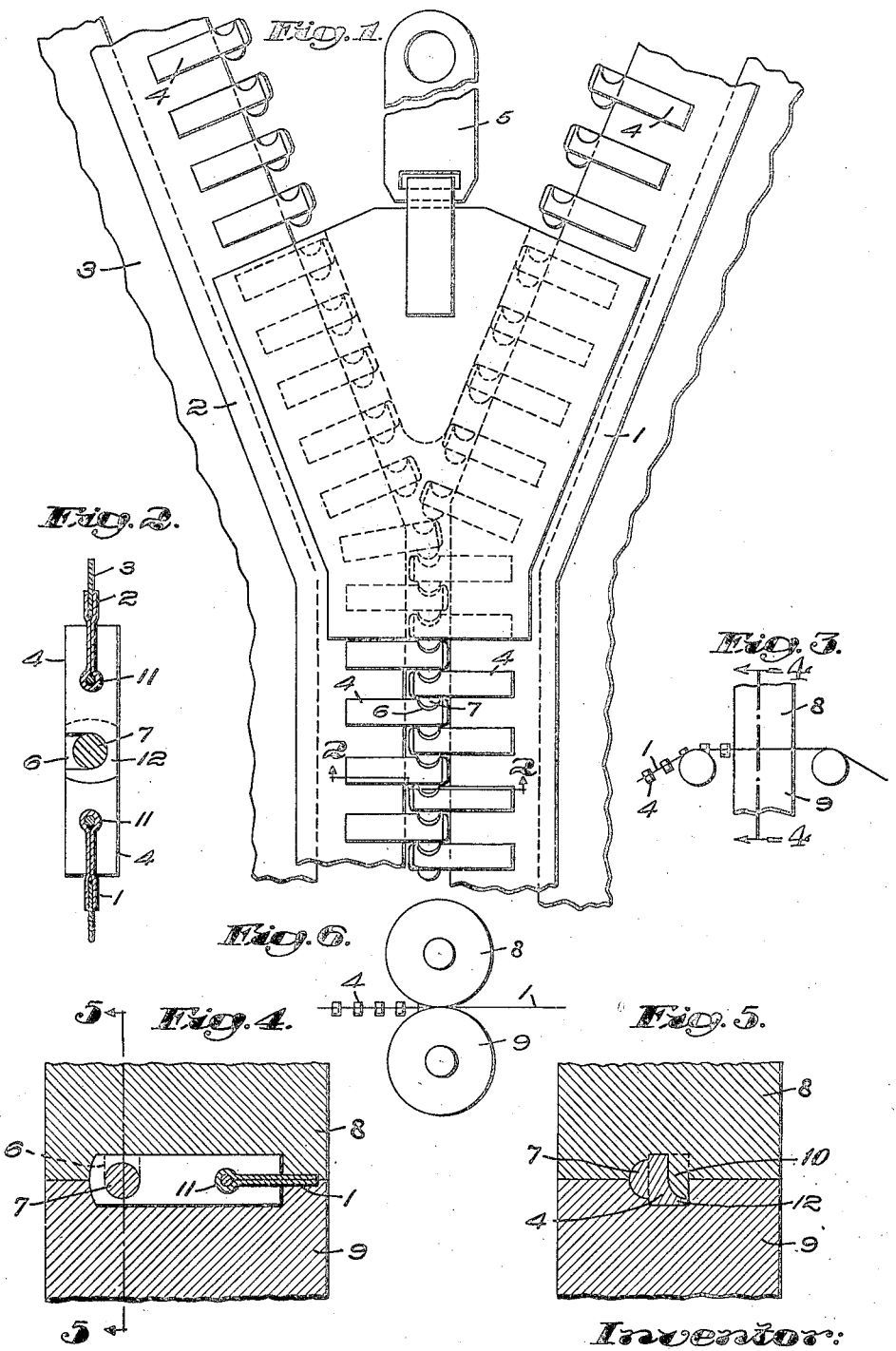

1,865,393

UNITED STATES PATENT OFFICE

GUSTAV JOHNSON, OF WEST ROXBURY, MASSACHUSETTS, ASSIGNOR TO UNITED-CARR FASTENER CORPORATION, OF CAMBRIDGE, MASSACHUSETTS, A CORPORATION OF MASSACHUSETTS

MULTIPLE OPERATED FASTENER

Application filed July 14, 1928. Serial No. 292,896.

My invention aims to provide improvements in multiple operated fasteners.

In the drawing which illustrates a preferred embodiment of my invention:—

Figure 1 is an elevational view of portions of stringers attached to a part having an opening to be closed by the fastener elements secured to the stringers and also shows a slider for fastening and unfastening the fastener elements;

Fig. 2 is an enlarged section taken on the line 2—2 of Fig. 1 showing parts in elevation and parts in cross-section;

Fig. 3 is a skeleton view showing one method of passing a tape or stringer between two molds which form and attach the fastener elements to the tape or stringer;

Fig. 4 is an enlarged section taken on the line 4—4 of Fig. 3 showing the manner in which the fasteners are molded and attached to the tape or stringer;

Fig. 5 is a section taken on the line 5—5 of Fig. 4 showing how the female fastening means is formed in the fastener element; and Fig. 6 is a skeletonized view of a pair of discs having a number of molds spaced about their peripheries for attaching a series of fastener elements to a stringer which is shown passing between the discs.

Referring to the embodiment of my invention illustrated by the drawing, I have shown, particularly in Figure 1, two tapes or stringers 1 and 2 of flexible material, attached to an article 3 adjacent the edges of an opening in the article. Each stringer has a number of fastener elements 4 secured thereto in spaced relation for engagement to close the opening in the article 3. A slider 5 of the conventional type is also shown.

My invention is in the fastener elements 4, the method of making them and the manner of attaching them to a stringer. Therefore, I have illustrated in a general manner a particular type of fastener element and means for making and assembling the fastener elements to a stringer.

Heretofore, fasteners of the general type illustrated have been made of metal and then attached to a stringer in various ways. My invention is directed primarily to the making of the fastener elements by molding them from a substance which when compressed will retain its shape or which may be heated during the compressing operation in order to harden the substance.

Heretofore, fasteners of the metal type were usually formed completely and thereafter attached to a stringer as a separate operation. My invention simplifies all this into a single operation whereby the fastener elements are molded and secured to the edge of a stringer at the same time, as best illustrated by Figs. 3 and 4.

One advantage of my invention is in the simple mold means by which female means, in the form of a single recess 6 formed in the outer face of each of the fastener elements 4 for engagement with the male means 7 of a cooperating fastener element, may be formed at the same time that the fastener element is formed and attached to a stringer. Therefore, I may form fastener elements in which each has a female or socket portion and a male or stud portion, as shown in the drawing, or one set of fastener elements may have two stud portions while the other set has two socket portions.

The mold blocks 8 and 9 shown in Figs. 3, 4 and 5 may be operated in any suitable manner and the moldable material may be fed into the molds in any suitable manner. Furthermore, the mold blocks 8 and 9 may be operated to move toward and away from each other or rotatable discs may be provided with a series of molds, as illustrated by Fig. 6.

In order to form the recess 6 at the same time the fastener elements are secured to a stringer, I have provided the mold block 8 with a male projection 10 which forms a recess 6 elongated from side to side of the fastener element. In fact the recess 6 extends through one side of the fastener element, as shown in Figs. 2 and 5, so that there is no wall at one side of the recess. The reason for one side of the recess being open is to allow the male projection 10 to come out of the recess after the fastener element has been formed and attached to a stringer.

The stringer is preferably provided with a beaded edge 11 (Figs. 2 and 4) so that the material which forms the fastener element will flow in back of the bead at each side of the stringer to lock the fastener in place.

While, in the particular method I have shown and described, it is necessary to extend the recess 6 through one side of the fastener element, the fact that there is no wall at one side of the recess does not interfere with the successful operation of the fastener elements. On the other hand, I find that the opening in the wall at one side of the recess is particularly advantageous from a standpoint of manufacture because the mechanical means required to form such fasteners is greatly simplified, as will be readily observed from an inspection of the drawing. Reference to Figs. 1 and 2 will readily disclose the fact that the fastener elements cannot be separated accidentally by side strains and stresses because the wall 12 at that side of the recess 6 opposite the opening effectively cooperates with the male portion 7 of a cooperating fastener element to prevent such separation. Furthermore the extension of the recess at one side completely through the wall provides for a certain amount of loose play between the fastening elements when engaged, thereby to permit a certain amount of rolling action between the fastener parts when the stringers are twisted.

I am aware that various means may be employed to secure the result which my application is intended to cover and, therefore, I wish it to be understood that my invention is directed broadly to the idea of forming fastener elements, for the purposes illustrated and described, from any kind of plastic material which may be formed into durable fastener elements of this type. I also wish it to be understood that I have illustrated and described a simple specific form of means for carrying out the method of forming the fastener elements and the method of attaching them to a stringer. Therefore, reference is made to the following claims to indicate the scope of my invention.

I claim:

1. A fastening installation of the class described comprising a pair of stringers each having attached to the edge thereof nearest the other stringer a series of molded fastening elements, male and female means provided by said fastening elements for cooperation with each other, each of the female means being in the form of a single recess formed in a face of a fastening element which faces the next fastener element, said recess being open at one of the side faces of the fastening element and closed at the opposite side face by a wall which forms a part of the fastening element at the closed side and is flush with said opposite side, said fastening element having a smooth uninterrupted surface at the bottom of said recess and a slider movable along said fastening elements to engage and disengage them.

2. A multiple operated fastener means comprising two stringers each arranged side by side, series of molded fastener members secured to the adjacent edges of said stringers, each of said fastener members having a single male projection at one face and a single female indentation at the other face to provide means for interengaging the fastener members of one stringer with the fastener members of the other stringer and each of said female indentations being open at one side of each fastener member and having a continuous wall surface at the opposite side of the fastener to close the indentation at that side as and for the purposes illustrated and described.

3. A multiple operated fastener means comprising two stringers each arranged side by side, series of molded fastener members secured to the adjacent edges of said stringers, each of said fastener members having a single male projection at one face and a single female indentation at the other face to provide means for interengaging the fastener members on one stringer with the fastener members of the other stringer and each of said female indentations being open at one side of each fastener member and having a continuous wall surface at the opposite side of the fastener to close the indentation at that side as and for the purposes illustrated and described, and said fastener members being attached to said stringers in a manner to arrange the open sides of all of the fasteners at one side of the series of fastener members, thereby to prevent accidental separation of the fastener members.

In testimony whereof, I have signed my name to this specification.

GUSTAV JOHNSON.